Dec. 20, 1949 J. R. SCHOENBAUM 2,491,691
LOAD RESPONSIVE CONTROL CIRCUIT
Filed Oct. 1, 1947 2 Sheets-Sheet 1

Joseph R. Schoenbaum
INVENTOR
by L. Malcolm Oberlin
ATTORNEY

Dec. 20, 1949       J. R. SCHOENBAUM       2,491,691
LOAD RESPONSIVE CONTROL CIRCUIT

Filed Oct. 1, 1947       2 Sheets-Sheet 2

Joseph R. Schoenbaum
INVENTOR
by L. Malcolm Oberlin
ATTORNEY

Patented Dec. 20, 1949

2,491,691

UNITED STATES PATENT OFFICE 2,491,691

LOAD RESPONSIVE CONTROL CIRCUIT

Joseph R. Schoenbaum, Roseland, N. J., assignor to Martin Elevator Company, Inc., New York, N. Y., a corporation of New York Application October 1, 1947, Serial No. 777,317

12 Claims. (Cl. 318—367)

1

This invention relates to control systems and, more particularly, to motor control systems which are responsive to the load on the motor.

This invention further relates to a system for producing a voltage which varies in accordance with the load on a motor and utilizing this voltage to control the application of electric power to the motor.

My novel control system is particularly useful in elevator installations to eliminate variations in stopping distance or "slide" caused by changing load conditions in the elevator car.

In accordance with my invention, I provide an electron tube circuit which is responsive to the current-voltage phase relationship in the supply line of a motor or other electrical device, this circuit producing a voltage which is a function of the load on the motor. This voltage may be utilized to actuate a time delay circuit controlling a relay or other current responsive device in the system, the length of the time delay being controlled by the impressed voltage and, hence, by the load on the motor.

In an elevator installation, as a car descends toward a given floor level, the elevator motor is disconnected and the brake is applied at a predetermined distance above the floor level. Thereafter, the car coasts or "slides" to its stopping position. If the car is lightly loaded, it may stop two or three inches above the floor level, or if heavily loaded, it may coast beyond the desired floor level. In accordance with this invention, when the car reaches a predetermined position, the main control switch is opened but application of the brake and opening of the motor supply circuits is delayed for a predetermined period, the length of which is determined by the load on the elevator motor. Thus, the length of the coasting period or "slide" is varied in accordance with the elevator load causing the car to stop precisely at the correct floor level.

Although my control system is particularly suited for use in elevator installations, it is applicable to many other motor control problems and such applications are included within the spirit and scope of the invention.

It is an object of the invention to provide an improved load-responsive control system for motors and other electrical devices.

It is a further object of the invention to provide a control system which is reliable in operation, of low cost, and uses standard components readily available for industrial use.

It is a still further object of the invention to provide a load-responsive system utilizing principles of operation hitherto overlooked in the motor control art.

Various other objects, advantages and features of the invention will become apparent from the following detailed description taken in conjunction with the accompanying drawings, in which.

Figure 1:
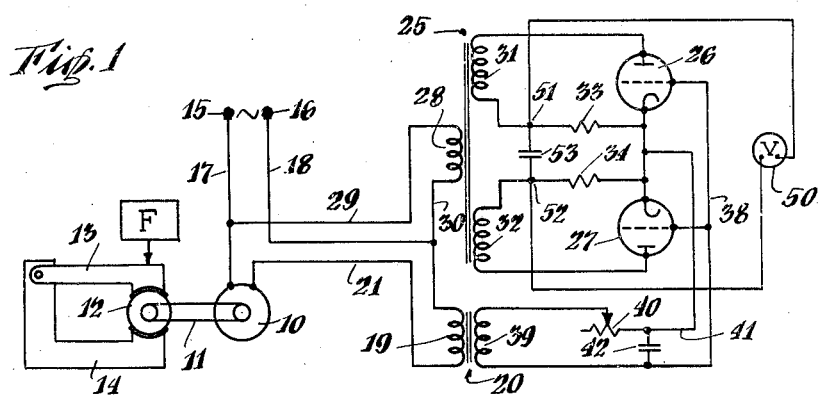
Figure 1 is a schematic diagram showing the load-responsive circuit.

Referring now to the drawings in detail and particularly to Figure 1, I have shown a circuit for producing a voltage which is a function of the load upon a single phase alternating current motor 10. The motor shaft is connected by a belt 11 to a brake drum 12 with which coacts a pair of pivoted braking levers 13 and 14. It will be apparent that the load on the motor 10 may be regulated by varying the pressure of the levers 13, 14 against the drum.

An alternating current source 15, 16 is provided for actuating the motor 10 and, to this end, terminal 15 is connected by a conductor 17 to one terminal of the motor while terminal 16 has attached thereto a lead 18 which extends to one end of a primary winding 19 of a transformer 20, the other end of which is connected to the other motor terminal by a conductor 21.

The current source 15, 16 also energizes a transformer 25 which supplies anode voltage to a pair of electron tubes 26 and 27. To this end, the primary winding 28 is connected to the current source 15, 16 by leads 29, 30 and a pair of secondary windings 31, 32 are provided for energizing the respective electron tubes 26 and 27, the anode circuit of tube 26 including the secondary winding 31 together with a load resistance 33 and the anode circuit of tube 27 including the secondary winding 32 together with a load resistance 34 which is preferably of the same value as resistor 33.

It will be noted that the voltages applied to the tube anodes by secondary windings 31, 32 are of opposite polarity and of opposite phase, the anode-cathode circuit of each tube functioning as a half wave rectifier circuit. This condition is illustrated in Figures 3 and 4 wherein curves 36 and 37 represent the respective voltages applied to the anodes of tubes 26 and 27.

In accordance with the invention, a voltage is applied to both electron tube control grids, the phase of said voltage being controlled by the load on the motor 10. To this end, the aforesaid control grids are interconnected by a conductor 38 which extends to one end of the secondary winding 39 of transformer 20 and the other end of the secondary winding is connected through a variable resistance 40 and lead 41 to the cathodes of tubes 26 and 27. Connected between conductors 38 and 41 is a condenser 42 which, together with the variable resistor 40, serves as a network for adjusting the phase of the voltage applied to the electron tube control grids.

It will be noted that the primary winding 19 is connected in series with the alternating current supply and the motor. Accordingly, during operation of the motor, an alternating voltage is induced in the secondary winding 39 and applied to the control grids of tubes 26 and 27, the phase of this voltage varying in response to changes in the current-voltage phase relationship in the primary or supply circuit caused by motor load variations. The transformer 20, therefore, serves as an inductive coupling device between the supply circuit and the control grids whereby phase changes in the supply circuit cause corresponding phase changes in the control grid voltages. It is considered within the scope of the invention to use other forms of coupling, such as capacitive coupling, between the supply circuit and the control grids, as those skilled in the art will understand.

Figure 3:
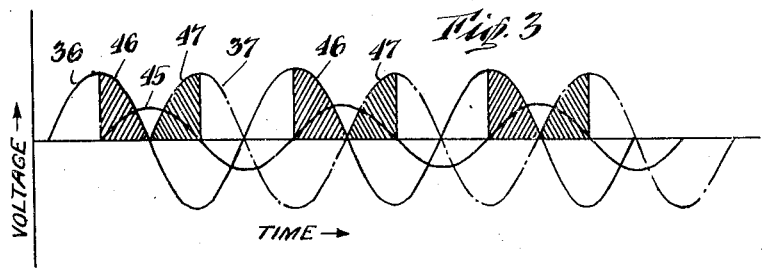
Figures 3 and 4 are graphs illustrating the operation of the load-responsive circuit.
Figure 4:
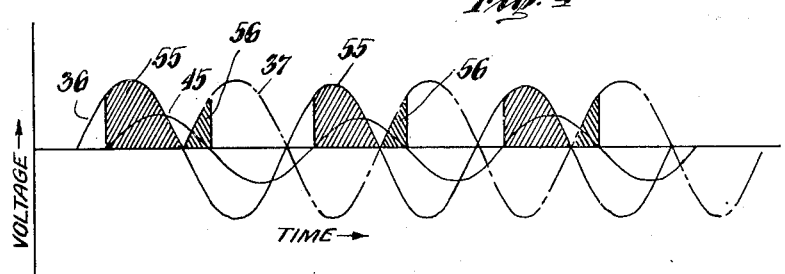

The effect of the control grid voltage may be readily understood from a consideration of Figures 3 and 4 wherein curve 45 represents the control grid voltage and the ordinate represents the tube cut off voltage which is shown as zero, for convenience. It will be noted that tube 26 conducts anode current when the anode voltage 36 is positive and the grid voltage 45 is above its cut off value, that is, during the portions of the respective alternating current cycles represented by the shaded areas 46, Figure 3. Similarly, tube 27 conducts anode current during the portions of the cycle represented by the shaded areas 47. The currents flowing in the respective anode circuits produce a voltage drop in the load resistors 33, 34 and a net voltage across said resistors which may be read by a voltmeter 50 connected at terminals 51 and 52 in the anode circuits. The reading of such voltages may be facilitated by connecting a condenser 53 between the terminals 51 and 52 to minimize pulsations in the voltmeter current.

In Figure 3, the grid voltage is 90 degrees out of phase with the respective anode voltages and, accordingly, the tubes 26, 27 are each energized during one fourth of the alternating current cycle. As a result, equal average currents flow in the anode circuits and the voltage drop across resistors 33 and 34 is likewise equal. Consequently the net voltage across terminals 51 and 52 is zero. The resistor 49 is preferably adjusted so that this condition exists when full load is imposed upon the motor 10.

Assuming that the load upon the motor is decreased by suitable adjustment of the levers 13 and 14, the motor current passing through the primary winding 19 will lag behind the motor voltage in proportion to the decrease in load. As a result, the phase of the control grid voltage will be shifted, for example, to the extent indicated by Figure 4. Accordingly, tube 26 will be energized for a greater part of each cycle, as indicated by the shaded areas 55, and tube 27 will be energized for a lesser portion of each cycle, as indicated by the shaded areas 56. Consequently, the average anode current of tube 26 will be larger than that of tube 27 and the voltage drop across resistor 33 will be larger than that across resistor 34. This produces a net voltage across terminals 51, 52 which may be read upon voltmeter 50.

It will be apparent that a small change in motor load will produce a small variation in the voltage across terminals 51, 52 while a large change in motor load will produce a large variation in said voltage. Accordingly, this voltage may be said to be proportional to the motor load, the term "proportional" and its derivatives being used in its broadest sense in the following description and the appended claims.

Although, for some purposes, one of the tubes 26, 27 may be omitted and a voltage obtained which varies in accordance with the motor load, the two tube circuit offers a number of important advantages. First, the voltage output is practically independent of variations in line voltage and changes in tube characteristics due to aging, which would not be the case with a one tube circuit. Second, the phase responsive circuit is effectively isolated from the delay circuit now to be described which is difficult to accomplish when only a single tube is used. In addition, a more even variation in output voltage over the entire range of motor load is obtainable with the present circuit. Finally, the relation between the voltage produced by the two tube circuit and the motor load is ideally suited for use in the delay circuit to produce accurate and reproducible results in the application of my control system to elevator installations. Where a three phase circuit is used, I also contemplate applying two phases to the respective electron tube anodes and the third phase to the control grids thereby producing a voltage across load resistances 33, 34 which is proportional to the motor load.

Figure 2:
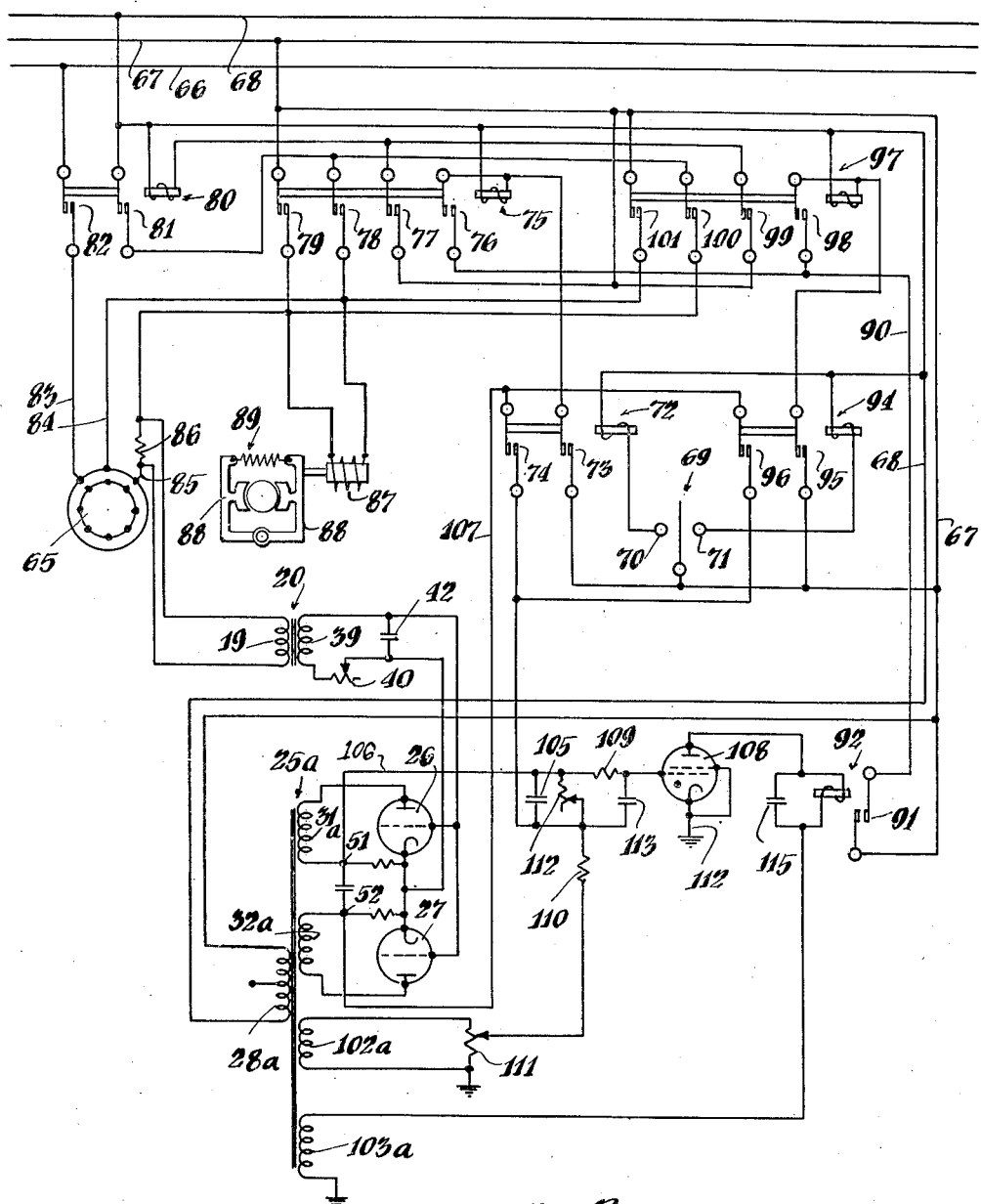
Figure 2 is a schematic diagram showing the load-responsive circuit and time delay circuit in combination with an elevator control system.

In Figure 2, I have shown the described phase responsive circuit in combination with a novel time delay circuit and the relay controls of an elevator installation. This circuit includes a polyphase induction motor 65 and a three phase alternating current supply represented by conductors 66, 67 and 68. During normal operation of the system, the motor supply circuit is controlled by a main switch 69 having a forward position 70, a reverse position 71, and a neutral position. When the control switch is moved to its forward position 70, the coil of a pilot relay 72 is connected across one phase 67, 68 of the current supply, thereby closing relay contacts 73 and 74. Responsive to the closure of contacts 73, the coil of a forward direction contactor relay 75 is energized, thereby closing relay contacts 76, 77, 78 and 79, closure of contacts 77, in turn, energizing the coil of a potential contactor relay 80 to close relay contacts 81 and 82.

Responsive to the closure of contactors 75 and 80, current is supplied to the motor leads 83, 84, 85 in proper phase relationship to cause forward operation of the motor. Thus, lead 83 is connected through contacts 82 to supply conductor 66, lead 84 is connected through contacts 78 and 81 to supply conductor 68, and lead 85 is connected through a dropping resistor 86 and contacts 79 to supply conductor 67. Further responsive to the closure of contactor 75, a solenoid 87 is energized which separates the levers 88 of a mechanical brake 89, the levers 88 being biased into engagement with the brake drum so that braking torque is applied to the shaft when the solenoid is deenergized. The closure of contacts 76 completes a holding circuit for forward direction contactor 75 which includes a lead 90, and the contacts 91 of a holding relay 92.

Assuming that relay 92 is energized, when the main switch 69 is moved from its forward position to its open or neutral position, pilot relay 72 is deenergized but contactors 75, 80 remain closed due to the described holding circuit. Accordingly, the motor continues to run and brake solenoid 87 remains energized for a timed period until relay contacts 91 are opened. Thereupon, contactors 75, 80 are deenergized, the motor is disconnected from the current supply, and solenoid 87 is deenergized, thereby applying braking torque to the motor shaft.

A generally similar action occurs when main switch 69 is moved to its reverse position 71. In this case, closure of the switch actuates a pilot relay 94, closing contacts 95 and 96. This energizes a reverse direction contactor relay 97 and closes its contacts 98, 99, 100 and 101, the closure of contacts 99 energizing potential contactor 80. As a result, current of reversed phase is supplied to the motor causing it to run in reverse direction. Thus, motor lead 83 is connected through contacts 82 to supply conductor 66, lead 84 is connected through contacts 101 to supply conductor 67, and lead 85 is connected through resistor 86, and contacts 100, 81 to supply conductor 68. It will be noted that lead 84 is connected to conductor 68 for forward operation and to conductor 67 for reverse operation while lead 85 is connected to conductor 67 for forward operation and to conductor 68 for reverse operation. This reversal of connections changes the direction of field rotation in the motor and cause it to run in opposite directions, as will readily be understood by those skilled in the art. The closure of reverse direction contactor 97 completes a holding circuit through contacts 98, 91 and energizes solenoid 87 thereby releasing the brake.

When control switch 69 is returned to its neutral position, relay 94 is deenergized but the supply of power to the motor is continued until the holding contacts 91 are opened with resultant deenergization of contactors 80 and 97. Thereupon, the motor supply circuits are interrupted and solenoid 87 is deenergized, thereby applying braking torque to the shaft. It will be apparent that the motor is operated and the brake is disabled for a timed period each time the control switch is returned to its neutral position from either its forward position 70 or reverse position 71, this timed period terminating when the contacts of relay 92 are opened.

In accordance with the invention, the length of this timed period is varied in accordance with the load on the elevator motor. To this end, I utilize the circuit of Figure 1 to produce a voltage which is proportional to the load and I provide a time delay circuit responsive to said voltage to energize relay 92, the length of the time delay varying in accordance with said voltage and the motor load.

The load responsive circuit of Figure 2 is generally similar to that shown in Figure 1 and like parts have been indicated by similar reference characters. In Figure 2, the transformer 25a has the same function as transformer 25 except that it is provided with two additional secondary windings 102a, 103a and it will be noted that the primary winding 19 is connected across dropping resistor 86 instead of in series with the supply circuit, as in Figure 1. In both circuits, however, the transformer 25 impresses an alternating voltage upon the control grids of tubes 26, 27 the phase of which varies in accordance with the load on the motor. This phase variation produces corresponding changes in the relative average current carried by the tubes and establishes a potential difference or voltage between terminals 51 and 52, which varies in accordance with the load on the motor.

In accordance with the invention, this potential difference is impressed upon an energy storage device which, in the example shown, is a condenser 105. To this end, terminal 51 is connected by a lead 106 to one terminal of condenser 105 while terminal 52 is connected through a lead 107 and relay contacts 74 or 96 to the other terminal of condenser 105. The condenser 105 is also connected to the control grid of a gas tube 108 through a resistor 109 and to ground through a resistor 110 and potentiometer 111, thereby completing the grid circuit through the gas tube cathode which is grounded at 112. These connections are so arranged that the voltage applied to the condenser and control grid is zero when the motor is heavily loaded, this voltage becoming positive as the motor load is decreased. Thus, the voltage impressed upon the condenser 105 is inversely proportional to the load on the motor.

An alternating current bias is supplied to the gas tube 108 by the secondary winding 102a and this bias, which is sufficient to prevent operation of the tube when no voltage is applied across condenser 105, may be controlled by adjustment of potentiometer 111. The effect of the voltage across condenser 105 upon the grid circuit may be varied by adjusting a variable resistance 112 connected in shunt with condenser 105 and a condenser 113 may be connected between the control grid and resistor 110.

The anode circuit of gas tube 108 includes the energizing winding of relay 92, which is shunted by a condenser 115, and the secondary winding 103a which supplies an alternating voltage to the anode. When the control grid voltage is above a critical value, anode current flows through the gas tube during the positive portion of each alternating current cycle thereby energizing relay 92 and the tube is non-conductive during the negative portion of each cycle, it being understood that the successive pulses of current in the anode circuit are sufficient to maintain continuous energization of the relay coil. When the control grid voltage falls below said critical value, the tube becomes non-conductive during the negative portion of the cycle and the cut off bias upon the control grid prevents conduction during the positive portions of the cycle. Accordingly, no anode current is conducted by the tube and the relay 92 is deenergized.

When the control switch 69 is moved to one of its operating positions, the brake is released and the motor runs in forward or reverse direction depending upon the position of said control switch. As a result, either contacts 74 or contacts 96 are closed thereby impressing the voltage between terminals 51, 52 upon condenser 105 and the gas tube grid circuit, said voltage varying in accordance with the load on the motor. The magnitude of this voltage is sufficient to overcome the cut off bias on gas tube 108 which, accordingly, becomes conductive and energizes relay 92 thereby completing the holding circuit for potential contactor 80 and the energized direction contactor 75 or 97.

When the control switch is returned to its neutral position, both pilot relays 72, 94 are deenergized thereby opening contacts 74, 96 and disconnecting the voltage across terminals 51, 52 from the condenser 105. At this time, the voltage across condenser 105 is equal to the voltage impressed thereon from terminals 51 and 52, the magnitude of said voltage being a function of the load on the motor. As soon as contacts 74, 96 are opened, the condenser 105 discharges through the grid circuit of gas tube 108 with the result that the control grid voltage decreases exponentially until the critical value is reached at which the tube becomes non-conductive and relay 92 is deenergized. Thereupon, the holding circuits are opened, the motor supply circuits are opened, and the brake is energized. Thus, opening of the supply circuits and energization of the brake are delayed for a timed period after the control switch is moved to its neutral position, this period starting when contacts 74, 96 are opened to initiate discharge of condenser 104 and ending when the grid voltage falls to its critical value responsive to the exponentially decreasing voltage impressed upon the grid circuit during discharge of the condenser.

Figure 5:
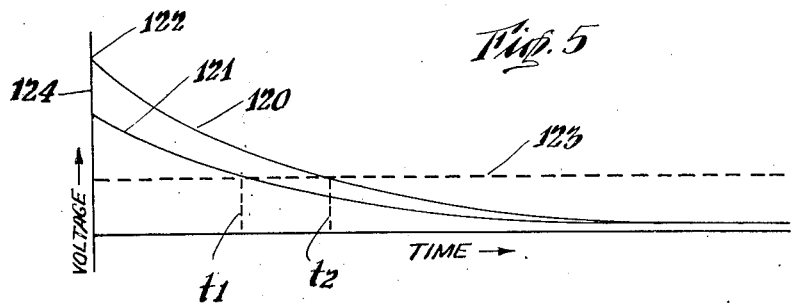
Figure 5 is a graph illustrating the operation of the time delay circuit.

The length of this timed period is proportional to the voltage impressed upon condenser 104 at the time it starts to discharge, this voltage, in turn, being inversely proportional to the load on the motor. Referring to Figure 5, wherein the abcissa represents time and the ordinate represents the control grid voltage of gas tube 108, curve 120 illustrates operation of the circuit when the motor is lightly loaded and curve 121 represents operation of the circuit when the motor is heavily loaded. In the former case, the initial voltage 122 applied to the condenser 105 is relatively high. When the control switch is moved to neutral position, the condenser discharges and the control grid voltage decreases exponentially until the critical voltage 123 is reached at time $t1$. Thus, when the motor is lightly loaded, the motor supply circuits are closed and the brake is deenergized for a relatively long period after the control switch is opened. When the motor is heavily loaded, the initial voltage 124 applied to condenser 105 is relatively low and the critical voltage 123 is reached in a shorter time $t2$. Accordingly, the motor supply circuits are closed and the brake is deenergized for a relatively short period after the control switch is opened.

In an elevator control system, a lightly loaded car may be stopped in a shorter interval than a heavily loaded car. In an automatic elevator system, a signal is received at a fixed distance, for example eight inches, from a given floor level causing the main switch to move to neutral position. If the brake is adjusted so that the car will move eight inches before stopping under normal load conditions, it may move only six inches if the car is lightly loaded or ten inches if the car is crowded resulting in unsatisfactory operation. In accordance with this invention, the control switch may, in all cases, be opened ten inches above the floor level. However, interruption of the supply circuit and energization of the brake may be delayed by the novel circuit until the car has traveled four inches if lightly loaded, two inches if normally loaded or only a fraction of an inch if heavily loaded. In this fashion, the car stops at precisely the correct level, regardless of load variations.

While the present invention, as to its objects and advantages, has been described herein as carried out in specific embodiments thereof, it is not desired to be limited thereby but it is intended to cover the invention broadly within the spirit and scope of the appended claims.

What is claimed as new and desired to be secured by Letters Patent is:

1. In a motor control system, in combination, a motor, a current actuated control device, and means for energizing said control device controlling said motor comprising an energy storage device, a tube having its anode connected in circuit with said control device and its control grid connected to said energy storage device, means for supplying power to said tube so that anode current is conducted therethrough and the control device is actuated when the grid voltage is above a critical value, means including a circuit for impressing a voltage on said storage device which is a function of the load on said motor, and switching means included in said circuit for disconnecting the voltage source from said storage device thereby causing said storage device to discharge through the grid circuit of said tube whereby said tube and said control device remain energized for a predetermined period until the grid voltage falls to its critical value responsive to the discharge of said storage device.

2. In a motor control system, in combination, a motor, a relay controlling the operation of said motor, and control means for energizing said relay comprising an energy storage device, a tube having its anode connected in circuit with said relay and its control grid connected to said energy storage device, means for supplying power to said tube so that relay-energizing current is conducted therethrough when the grid voltage is above a critical value, means for producing a potential across said storage device which is a function of the load on said motor, and means for initiating discharge of said storage device through the grid circuit of said tube to start a timed period during which relay-energizing current is conducted through said tube, said potential thereafter progressively decreasing responsive to the discharge of said storage device until the critical grid voltage is reached thereby terminating the flow of said relay-energizing current, the length of the period of relay energization being a function of the potential impressed on said storage device and the load on said motor.

3. In a motor control system, an alternating current supply, a motor, a contactor for connecting said motor to said current supply, a control switch for energizing said contactor, a holding relay for energizing said contactor for a timed period after the control switch is opened, and control means for actuating said relay comprising an energy storage device, a gas tube having its anode connected in circuit with said relay and its control grid connected to said energy storage device, means for supplying power to said tube so that relay-energizing current is conducted therethrough when the grid voltage is above a critical value, means for producing a potential across said storage device which is a function of the load on said motor, and means for initiating discharge of said storage device through the grid circuit of said tube to start a timed period during which relay-energizing current is conducted through said tube, said potential thereafter progressively decreasing responsive to the discharge of said storage device until the critical grid voltage is reached thereby terminating the flow of said relay-energizing current, the length of the period of relay energization being a function of the potential impressed on said storage device and the load on said motor.

4. In a motor control system, an alternating current supply, a motor, a contactor for connecting said motor to said current supply, a switch for controlling said contactor, a holding relay for energizing said contactor for a timed period after the control switch is opened, and control means for actuating said relay comprising a condenser, a gas tube having its anode connected in circuit with said relay and its control grid connected to said condenser, means for supplying alternating current to said anode and a cut off bias to said control grid, means for impressing a voltage on said condenser which is inversely proportional to the load on said motor thereby raising the grid voltage above a critical value to actuate said gas tube and said relay, and means responsive to the opening of said control switch to discharge said condenser through the grid circuit whereby the grid voltage decreases exponentially, for a timed period, until the critical voltage is reached at which said gas tube is disabled and said relay is deenergized, the length of said timed period of relay energization varying with the voltage impressed on said condenser and the load on said motor.

5. In a motor control system, an alternating current supply, a motor, a contactor for connecting said motor to said current supply, a switch for controlling said contactor, a holding relay for energizing said contactor for a timed period after the control switch is opened, and control means for actuating said relay comprising a condenser, a gas tube having its anode connected in circuit with said relay and its control grid connected to said condenser, means for supplying alternating current to said anode and a cut-off bias to said control grid whereby the tube becomes conductive when the grid voltage rises above a critical value, means for impressing a voltage on said condenser which is a function of the load on said motor thereby increasing the grid voltage above its critical value and energizing said relay, switching means for disconnecting said voltage source from said condenser thereby initiating discharge of the same through the grid circuit and starting a timed period of relay energization, the grid voltage thereafter decreasing exponentially until the critical value is reached at which the tube is disabled and the relay is deenergized, the length of said timed period of relay energization being a function of the voltage impressed upon said condenser and the load on said motor.

6. In a motor control system, a polyphase alternating current motor, a power supply therefor, forward and reverse direction contactors for connecting said motor to said power supply in normal and reverse phase relationship, respectively, a control switch having forward, reverse, and neutral positions for selectively energizing said direction contactors, a brake operable when both of said direction contactors are deenergized, a holding relay for maintaining each energized contactor in closed position for a timed period after said control switch is moved to its neutral position, and control means for actuating said holding relay comprising a condenser, a gas tube having its anode connected in circuit with said relay and its control grid connected to said condenser, means for supplying alternating current to said anode and a cut-off bias to said control grid whereby the tube and relay are energized when the grid voltage is above a critical voltage, means for impressing a voltage upon said condenser which varies in response to the load on said motor, thereby raising the grid voltage above its critical value to actuate said gas tube and said relay, and relay means responsive to movement of said control switch to its neutral position to disconnect said voltage from said condenser whereby the grid voltage decreases exponentially, for a timed period, until the critical voltage is reached at which said gas tube is disabled and said relay is deenergized, the length of said timed period varying with the voltage impressed on said condenser and the load on said motor.

7. In a control system, a load, a circuit for supplying alternating current to said load, a relay controlling the actuation of said motor, and control means for actuating said relay comprising a condenser, a tube having its anode connected in circuit with said relay and its control grid connected to said condenser, means for supplying current to said anode and a cut-off bias to said control grid whereby said tube is energized when the grid voltage rises above a critical value, means for impressing a voltage on said condenser which is proportional to the power drawn by said load, and means for discharging said condenser through said grid circuit to provide a timed period of tube and relay actuation, the length of said period varying with the voltage impressed on said condenser and the power drawn by said load.

8. In a motor control system, a motor, a brake, a circuit for supplying alternating current to said motor, a relay controlling the actuation of said motor and said brake, a pair of electron tubes having their anode circuits supplied with alternating voltages of opposite phase, respectively, coupling means interconnecting said supply circuit and both of the electron tube control grids whereby a potential difference is established between said anode circuits and which is proportional to the load on said motor, and control means for actuating said relay comprising a condenser, a gas tube having its anode connected in circuit with said relay and its control grid connected to said condenser, means for supplying alternating current to the gas tube anode and a cut-off bias to the gas tube grid, means for impressing said potential difference upon said condenser, and means for discharging said condenser through said grid circuit to provide a timed period of relay actuation, the length of said period varying with the voltage impressed on said condenser and the load on said motor.

9. In a motor control system, a motor, a brake, a circuit for supplying alternating current to said motor, a relay controlling the actuation of said motor and said brake, a pair of electron tubes having their anode circuits supplied with alternating voltages of opposite phase, respectively, a transformer for coupling said supply circuit with both of the electron tube control grids whereby a potential difference is established between portions of said anode circuits, said potential difference being proportional to the load on said motor, and control means for actuating said relay comprising a condenser, a gas tube having its anode connected in circuit with said relay and its control grid connected to said condenser, means for supplying alternating current to the gas tube anode and a cut-off bias to the gas tube control grid whereby said gas tube and relay are energized when the grid voltage rises above a critical value, a circuit for impressing said potential difference upon said condenser and said gas tube control grid thereby energizing said gas tube and said relay, and a switch for breaking the last mentioned circuit to discharge said condenser through the grid circuit, said tube and said relay remaining energized until the grid voltage falls to its critical value responsive to the exponential discharge of said condenser, the length of said period being proportional to the voltage impressed upon said condenser.

10. In a motor control system, a motor, a circuit for supplying alternating current to said motor, a contactor for opening and closing said circuit, a switch for controlling said contactor, a holding relay for energizing said contactor for a timed period after the control switch is opened, and means for actuating said relay comprising a pair of electron tubes each having an anode, a cathode, and a control grid, an anode circuit for each tube comprising an alternating current source and a load resistance, the voltages in said anode circuits being of opposed phase relationship, a transformer connecting said supply circuit with both of said control grids whereby a net voltage is developed between said load resistances which is proportional to the load on said motor, a condenser, a gas tube having its anode connected in circuit with said relay and its control grid connected to said condenser, means for supplying alternating current to the gas tube anode and a cut-off bias to the gas tube control grid whereby said gas tube and relay are energized when the grid voltage rises above a critical value, a circuit for impressing said potential difference upon said condenser and said gas tube control grid thereby energizing said gas tube and said relay, and relay means actuated upon opening said control switch for breaking the last mentioned circuit to discharge said condenser through the grid circuit, said tube and said relay remaining energized until the grid voltage falls to its critical value responsive to the exponential discharge of said condenser, the length of said period being proportional to the voltage impressed upon said condenser.

11. In a motor control system, a polyphase alternating current motor, a power supply therefor, forward and reverse direction contactors for connecting said motor to said power supply in normal and reverse phase relationship, respectively, a control switch having forward, reverse, and neutral positions for selectively energizing said direction contactors, a brake operable when both of said direction contactors are deenergized, a holding relay for maintaining each energized contactor in closed position for a timed period after said control switch is moved to its neutral position, and control means for actuating said holding relay comprising a pair of electron tubes each having an anode, a cathode, and a control grid, an anode circuit for each tube comprising an alternating current source, and a load resistance, the voltages in said anode circuits being of opposed phase relationship, a transformer having its primary winding connected in series with a winding of said motor and having its secondary winding connected in circuit with both of said control grids whereby a net voltage is developed between said load resistances, said voltage being proportional to the load on said motor, a condenser, a gas tube having its anode connected in circuit with said relay and its control grid connected to said condenser, means for supplying alternating current to the gas tube anode and a cut-off bias to the gas tube control grid whereby said gas tube and relay are energized when the grid voltage rises above a critical value, a circuit for impressing said potential difference upon said condenser and said gas tube control grid thereby energizing said gas tube and said relay, and relay means operable upon movement of said control switch to neutral position to break the last mentioned circuit to discharge said condenser through the grid circuit, said tube and said relay remaining energized until the grid voltage falls to its critical value responsive to the exponential discharge of said condenser, the length of said period being proportional to the voltage impressed upon said condenser.

12. In an elevator control system, a polyphase alternating current elevator motor, a power supply therefor, forward and reverse direction contactors for connecting said motor to said power supply in normal and reverse phase relationship, respectively, control means for selectively energizing said contactors, a brake operable when both of said direction contactors are deenergized, a holding relay for maintaining each energized contactor in closed position for a timed period after said control means is deenergized whereby the motor continues to run and the brake is deenergized during such timed period, the length of which is controlled by the load on the motor so as to adjust the "slide" of the elevator response to the load thereon causing the elevator to stop at the correct floor level, and means for actuating said holding relay comprising a pair of electron tubes each having an anode, a cathode, and a control grid, an anode circuit for each tube comprising an alternating current source, and a load resistance, the voltages in said anode circuits being of opposed phase relationship, a transformer having its primary winding connected in series with a winding of said motor and having its secondary winding connected in circuit with both of said control grids whereby a net voltage is developed between said load resistances, said voltage being proportional to the load on said motor, a condenser, a gas tube having its anode connected in circuit with said relay and its control grid connected to said condenser, means for supplying alternating current to the gas tube anode and a cut-off bias to the gas tube control grid whereby said gas tube and relay are energized when the grid voltage rises above a critical value, a circuit for impressing said potential difference upon said condenser and said gas tube control grid thereby energizing said gas tube and said relay, and relay means operable upon deenergization of said control means to break the last mentioned circuit to discharge said condenser through the grid circuit, said tube and said relay remaining energized until the grid voltage falls to its critical value responsive to the exponential discharge of said condenser, the length of said period being proportional to the voltage impressed upon said condenser.

JOSEPH R. SCHOENBAUM.

REFERENCES CITED

The following references are of record in the file of this patent:

UNITED STATES PATENTS

| Number | Name | Date |
|---|---|---|
| 1,903,550 | Mechling | Apr. 11, 1933 |
| 1,967,857 | Bethenod | July 24, 1934 |
| 2,086,120 | Croden | July 6, 1937 |